United States Patent
Shinagawa et al.

(10) Patent No.: US 12,257,821 B2
(45) Date of Patent: *Mar. 25, 2025

(54) RADIO-WAVE ANTI-REFLECTION SHEET, TAPE AND VEHICLE MEMBER

(71) Applicant: 3M INNOVATIVE PROPERTIES COMPANY, St. Paul, MN (US)

(72) Inventors: Masataka Shinagawa, Niiza (JP); Keiichiro Horikoshi, Yamagata (JP); Koji Hishitani, Tokyo (JP); Masaaki Takeda, Sagamihara (JP)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/567,917

(22) PCT Filed: Jun. 16, 2022

(86) PCT No.: PCT/IB2022/055604
§ 371 (c)(1),
(2) Date: Dec. 7, 2023

(87) PCT Pub. No.: WO2023/275651
PCT Pub. Date: Jan. 5, 2023

(65) Prior Publication Data
US 2024/0262076 A1  Aug. 8, 2024

Related U.S. Application Data
(60) Provisional application No. 63/216,625, filed on Jun. 30, 2021.

(51) Int. Cl.
*B32B 5/32* (2006.01)
*B32B 5/18* (2006.01)
(Continued)

(52) U.S. Cl.
CPC ............... *B32B 5/32* (2013.01); *B32B 5/18* (2013.01); *B32B 7/02* (2013.01); *B32B 7/06* (2013.01);
(Continued)

(58) Field of Classification Search
CPC .... B32B 5/32; B32B 5/18; B32B 7/02; B32B 7/06; B32B 7/12; B32B 27/065;
(Continued)

(56) References Cited

U.S. PATENT DOCUMENTS 3,607,601 A * 9/1971 Milam, Jr. ............... B32B 5/18
264/46.4
4,017,656 A * 4/1977 Lasman .................. B32B 5/26
428/218
(Continued)

FOREIGN PATENT DOCUMENTS

JP    H06-224586 A    8/1994
JP    2008249678 A    10/2008
(Continued)

OTHER PUBLICATIONS

International Search Report for PCT Application No. PCT/IB2022/055604, mailed on Sep. 19, 2022, 4 pages.

*Primary Examiner* — Patricia L. Nordmeyer
(74) *Attorney, Agent, or Firm* — Clifton F. Richardson

(57) ABSTRACT

A radio-wave anti-reflection sheet has a substantially non-tacky first major surface and an opposing substantially tacky second major surface and includes a first polymeric foam layer disposed between the first and second major surfaces, and a second polymeric foam layer disposed between the second major surface and the first polymeric foam layer. The first polymeric foam has a thickness from 0.05 to 3.0 mm and a density from 0.20 to 0.90 g/cm3. The second polymeric foam layer has a thickness from 0.05 to 3.0 mm and
(Continued)

a density greater than 0.10 g/cm3 and less than the density of the first polymeric foam layer. A tape includes the radio-wave anti-reflection sheet disposed on a release liner. A vehicle member includes a multilayer substrate and the radio-wave anti-reflection sheet disposed on the multilayer substrate.

18 Claims, 10 Drawing Sheets

(51) Int. Cl.
    *B32B 7/02*     (2019.01)
    *B32B 7/06*     (2019.01)
    *B32B 7/12*     (2006.01)
    *B32B 27/06*     (2006.01)
    *B32B 27/36*     (2006.01)

(52) U.S. Cl.
    CPC .............. *B32B 7/12* (2013.01); *B32B 27/065* (2013.01); *B32B 27/365* (2013.01); *B32B 2264/101* (2013.01); *B32B 2264/2032* (2020.08); *B32B 2266/0242* (2013.01); *B32B 2307/212* (2013.01); *B32B 2307/72* (2013.01); *B32B 2307/7376* (2023.05); *B32B 2307/748* (2013.01); *B32B 2405/00* (2013.01); *B32B 2605/00* (2013.01)

(58) Field of Classification Search
    CPC ............ B32B 27/365; B32B 2264/101; B32B 2264/2032; B32B 2266/0242; B32B 2307/212; B32B 2307/72; B32B 2307/7376; B32B 2307/748; B32B 2405/00; B32B 2605/00
    See application file for complete search history.

(56) References Cited

U.S. PATENT DOCUMENTS

| | | | |
|---|---|---|---|
| 5,453,328 | A | 9/1995 | Nagano et al. |
| 6,339,111 | B1 | 1/2002 | Moon et al. |
| 8,877,331 | B2 * | 11/2014 | Nadella ................. B32B 27/285 |
| | | | 428/36.5 |
| 10,205,215 | B2 | 2/2019 | Miyoshi et al. |
| 11,637,367 | B2 | 4/2023 | Salehi et al. |
| 2012/0031032 | A1* | 2/2012 | Deiss ........................ E06B 1/62 |
| | | | 428/317.1 |
| 2012/0037213 | A1* | 2/2012 | Cheng ................... H01L 31/049 |
| | | | 136/251 |
| 2015/0109162 | A1 | 4/2015 | Binzer |
| 2018/0059299 | A1* | 3/2018 | Grubb ....................... B32B 5/18 |
| 2018/0257334 | A1* | 9/2018 | Motoyanagi ............ B32B 33/00 |
| 2023/0236286 | A1 | 7/2023 | Shinagawa et al. |

FOREIGN PATENT DOCUMENTS

| | | |
|---|---|---|
| JP | 2013102512 A | 5/2013 |
| JP | 2017161431 A | 9/2017 |
| WO | 2017022003 A1 | 2/2017 |
| WO | 2020196420 A1 | 10/2020 |
| WO | 2021209833 A1 | 10/2021 |
| WO | 2021209834 A1 | 10/2021 |

\* cited by examiner

US 12,257,821 B2

RADIO-WAVE ANTI-REFLECTION SHEET, TAPE AND VEHICLE MEMBER

CROSS REFERENCE TO RELATED APPLICATIONS

This application is a national stage filing under 35 U.S.C. 371 of PCT/IB2022/055604, filed Jun. 16, 2022, which claims the benefit of U.S. Application No. 63/216,625, filed Jun. 30, 2021, the disclosures of which are incorporated by reference in their entireties herein.

BACKGROUND

Efforts to equip automobiles with radar devices are advancing in order to improve automotive safety and further advance towards practical applications of automated driving.

SUMMARY

The present description relates to a radio-wave anti-reflection sheet, a tape including a radio-wave anti-reflection sheet, and a vehicle member including a radio-wave anti-reflection sheet. The radio-wave anti-reflection sheet can be configured to reduce reflection of radio waves from a multilayer substrate and may include a higher density foam layer and a lower density foam layer where the lower density foam layer is configured to face the substrate. For example, the lower density foam layer can have a tacky surface for bonding to the substrate or an adhesive layer can be disposed on the lower density foam layer for bonding to the substrate.

In some aspects, the present description provides a radio-wave anti-reflection sheet including a substantially non-tacky first major surface and an opposing substantially tacky second major surface: a first polymeric foam layer disposed between the first and second major surfaces and having a thickness from 0.05 to 3.0 mm and a density from 0.20 to 0.90 g/cm$^3$; and a second polymeric foam layer disposed between the second major surface and the first polymeric foam layer and having a thickness from 0.05 to 3.0 mm and a density greater than 0.10 g/cm$^3$ and less than the density of the first polymeric foam layer. A tape can include the radio-wave anti-reflection sheet disposed on a release surface of a release liner. A vehicle member can include a multilayer body portion including a first layer disposed between second and third layers where the first layer has a lower density than each of the second and third layers; and the radio-wave anti-reflection sheet where the second major surface of the radio-wave anti-reflection sheet is disposed on, and bonded to, an outermost major surface of the multilayer body portion.

These and other aspects will be apparent from the following detailed description. In no event, however, should this brief summary be construed to limit the claimable subject matter.

DETAILED DESCRIPTION

Figure 1A:
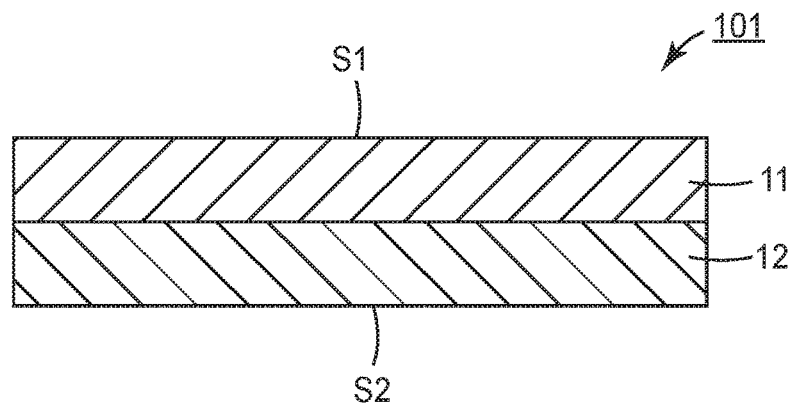
FIGS. 1A-1B are schematic cross-sectional views of radio-wave anti-reflection sheets, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

It is typically desired for radar devices mounted in automobiles to detect not only four-wheeled vehicles and larger commercial vehicles in the surrounding area, but also pedestrians and compact vehicles such as two-wheeled vehicles. However, reflected waves from a human body and compact vehicles are typically weak, and therefore detection of these target objects by a radar device is easily affected by noise. In particular, when a radar device is provided inside a cover member (e.g., a portion of a body portion of a vehicle member that may include an accommodation chamber in which the radar device can be installed), it tends to be difficult to detect a human body or the like with high accuracy due to waves reflected by the cover member. Therefore, in order to detect weak reflected waves from a human body or the like with high accuracy using a radar device provided inside a cover member, it is desirable to suppress the reflected waves from the cover member.

Traditionally, a two-layer anti-reflection sheet for reducing reflection from a substrate includes a higher density layer facing the substrate and a lower density layer facing away from the substrate where the higher density layer has a density less than the density of the substrate and the lower density layer has a density higher than that of air. However, it has been found that for multilayer substrates that include a lower density (and/or lower permittivity) layer between two higher density (and/or higher permittivity) layers, that such two-layer anti-reflection sheets have limited effectiveness due to additional reflections at interfaces between the lower density and higher density layers of the multilayer substrates. Such multilayer substrates may be used in a body portion of a vehicle member that may include an accommodation chamber for a radar device. According to some embodiments of the present description, it has been found that a radio-wave anti-reflection sheet using a lower density layer facing the substrate and a higher density layer facing away from the substrate can effectively reduce reflection from a multilayer substrate. In some embodiments, the radio-wave anti-reflection sheet creates reflections at various interfaces (e.g., between layers of the sheet, between the sheet and the multilayer substrate, and/or between air and the sheet) that combine with reflections from various interfaces of the multilayer substrate to result in a low reflection due to destructive interference. In some embodiments, a radio-wave anti-reflection sheet substantially reduces reflected waves from a multilayer substrate in a desired region of an E-band frequency band from approximately 60 to 90 GHz.

FIG. 1A is a schematic cross-sectional view of a radio-wave anti-reflection sheet 101 having a substantially non-tacky first major surface S1 and an opposing substantially tacky second major surface S2, according to some embodiments. A surface is substantially tacky when the tack at room temperature is sufficient to bond the radio-wave anti-reflection sheet to a polymeric substrate with sufficient strength that the bond can at least support the weight of the radio-wave anti-reflection sheet (e.g., when vertically oriented or oriented with the radio-wave anti-reflection sheet facing down). A surface is substantially non-tacky when the tack at room temperature is sufficiently weak that the weight of the radio-wave anti-reflection sheet is sufficient to cause the sheet to readily detach from a polymeric substrate (e.g., when the sheet is vertically oriented or when the radio-wave anti-reflection sheet faces down). The term "room temperature" has its conventional meaning, referring to temperatures of from 20-25° C. The substantially tacky second major surface S2 may be adapted to bond to a substrate while the second layer S1 faces away from the substrate.

The sheet 101 includes a first polymeric foam layer 11 disposed between the first and second major surfaces and having a thickness from 0.05 to 3.0 mm and a density from 0.20 to 0.90 g/cm$^3$; and a second polymeric foam layer 12 disposed between the second major surface and the first polymeric foam layer 11 and having a thickness from 0.05 to 3.0 mm and a density greater than 0.10 g/cm$^3$ and less than the density of the first polymeric foam layer 11. In some embodiments, a difference between the densities of the first and second polymeric foam layers 11 and 12 is greater than 0.05 g/cm$^3$, or greater than 0.08 g/cm$^3$, or greater than 0.1 g/cm$^3$, for example. More generally, a difference between the densities of adjacent polymeric foam layers in a radio-wave anti-reflection sheet can be in any of these ranges. The densities (and/or relative permittivities) of the first and second polymeric foam layers 11 and 12 may be chosen to result in a low or minimum reflection from the radio-wave anti-reflection sheet for a predetermined frequency in an E-band frequency range, for example, when disposed on a multilayer substrate as described further elsewhere herein. In some embodiments, the density of the first polymeric foam layer 11 is from 0.40 to 0.90 g/cm$^3$, or 0.50 to 0.90 g/cm$^3$, or 0.60 to 0.90 g/cm$^3$, or 0.70 to 0.85 g/cm$^3$, for example. In some such embodiments, or in other embodiments, the density of the second polymeric foam layer 12 is from 0.10 to 0.85 g/cm$^3$, or 0.20 to 0.80 g/cm$^3$, or 0.30 to 0.80 g/cm$^3$, or 0.40 to 0.80 g/cm$^3$, or 0.40 to 0.70 g/cm$^3$, or 0.50 to 0.70 g/cm$^3$, for example. In some embodiments, each of the polymeric foam layers of the radio-wave anti-reflection sheet has a density in a range of 0.30 to 0.90 g/cm$^3$ or 0.50 to 0.85 g/cm$^3$, for example.

The thicknesses of the first and second polymeric foam layers 11 and 12 may also be chosen to result in a low or minimum reflection from the radio-wave anti-reflection sheet for a predetermined frequency in an E-band frequency range, for example, when disposed on a multilayer substrate as described further elsewhere herein. In some embodiments, at least one of the first and second polymeric foam layers 11 and 12 has a thickness of at least 0.10 mm, or at least 0.20 mm, or at least 0.30 mm, or at least 0.40 mm, or at least 0.50 mm, and the thickness may be no more than 2.00 mm, or no more than 1.50 mm, or no more than 1.00 mm, or no more than 0.90 mm, for example. In some embodiments, each of the thicknesses of the first and second polymeric foam layers 11 and 12 is in at least one of these ranges. In some embodiments, each of the polymeric foam layers of the radio-wave anti-reflection sheet has a thickness in at least one of these ranges.

The thicknesses and densities of the polymeric foam layers for reducing reflection at a predetermined wavelength from a predetermined multilayer substrate can be determined as follows. Conventional modeling techniques can be used to calculate the reflection of radio waves having the predetermined frequency from the radio-wave anti-reflection sheet when disposed on the predetermined multilayer substrate as a function of the relative permittivities and thicknesses of the polymeric foam layers of the radio-wave anti-reflection sheet. This allows the desired relative permittivities and thicknesses of the polymeric foam layers resulting in a low or minimum reflection to be established. A relationship between the relative permittivity and the density can be determined by measuring the relative permittivity at the predetermined frequency for polymeric foam layers having a range of densities to establish the relationship. From the calculated desired relative permittivities and the relationship between relative permittivity and density, the desired densities of the polymeric foam layers can be determined.

Figure 1B:
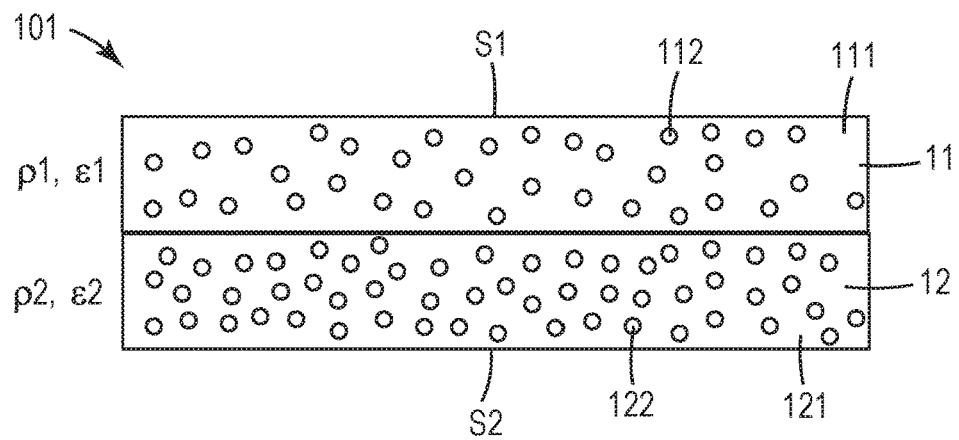

A polymeric foam layer is generally a foam layer including a continuous polymeric phase. In some embodiments, the first and second polymeric foam layers 11 and 12 include respective foam cells 112 and 122 dispersed in respective polymeric matrices 111 and 121. FIG. 1B is a schematic cross-sectional view of the radio-wave anti-reflection sheet 101, according to some embodiments, schematically showing the foam cells. As described further elsewhere herein the foam cells 112 and/or 122 may be gas bubbles, hollow particles or a combination thereof. The hollow particles may be hollow microspheres and/or expanded microspheres, for example. The polymeric matrices 111 and 121 may be (meth)acrylate matrices, for example. For example, in some embodiments, the second polymeric foam layer 12 (and optionally the first polymeric foam layer 11) includes a (meth)acrylate matrix; and gas bubbles, hollow particles, or a combination thereof, dispersed in the matrix. In some such embodiments, the second polymeric foam layer (and optionally the first polymeric foam layer 11) includes the hollow particles dispersed in the matrix, where the hollow particles are or include hollow (e.g., glass or polymer) microspheres. The densities $\rho 1$ and $\rho 2$ of the respective first and second polymeric foam layers 11 and 12 are schematically indicated. The density $\rho 2$ can be less than the density $\rho 1$ due to the larger volume of foam cells in layer 12 than in layer 11. Similarly, the relative permittivities $\varepsilon 1$ and $\varepsilon 2$ of the respective first and second polymeric foam layers 11 and 12 are schematically indicated. The relative permittivity $\varepsilon 2$ can be less than the relative permittivity ε1 due to the larger volume of foam cells in layer 12 than in layer 11.

In some embodiments, for at least one frequency in a range of 60 to 90 GHz, the first polymeric foam layer 11 has a relative permittivity from 1.2 to 4.0, or 1.5 to 3.0, or 1.8 to 2.5 and the second polymeric foam layer 12 has a relative permittivity greater than 1.1 and less than the relative permittivity of the first polymeric foam layer. In some embodiments, for the at least one frequency in a range of 60 to 90 GHz, the second polymeric foam layer 12 has a relative permittivity from 1.1 to 3.0, or 1.4 to 2.5, or 1.6 to 2.1. In some embodiments, a difference between the relative permittivities of the first and second polymeric foam layers 11 and 12 is greater than 0.05, or greater than 0.1, or greater than 0.15, or greater than 0.2, for example. More generally a difference between the relative permittivities of adjacent polymeric foam layers in a radio-wave anti-reflection sheet can be in any of these ranges. The relative permittivities of the first and second polymeric foam layers 11 and 12 may be chosen to result in a low or minimum reflection from the radio-wave anti-reflection sheet for a predetermined frequency in an E-band frequency range, for example, when disposed on a multilayer substrate as described further elsewhere herein.

In some embodiments, the polymer of the polymeric matrix 121 can be formulated to be a pressure-sensitive adhesive (e.g., a (meth)acrylate pressure-sensitive adhesive) while the polymer of the polymeric matrix 111 can be formulated to be a non-adhesive (e.g., a polymer that is non-tacky at room temperature). In some embodiments, the polymer of the polymeric matrix 121 is not an adhesive, and an additional adhesive layer is included to provide the substantially tacky second major surface S2. In some embodiments, the polymer of the polymeric matrix 111 can be formulated to be a pressure-sensitive adhesive, and a non-tacky layer (e.g., a protective layer) is included to provide the substantially non-tacky first major surface S1.

Figure 2:
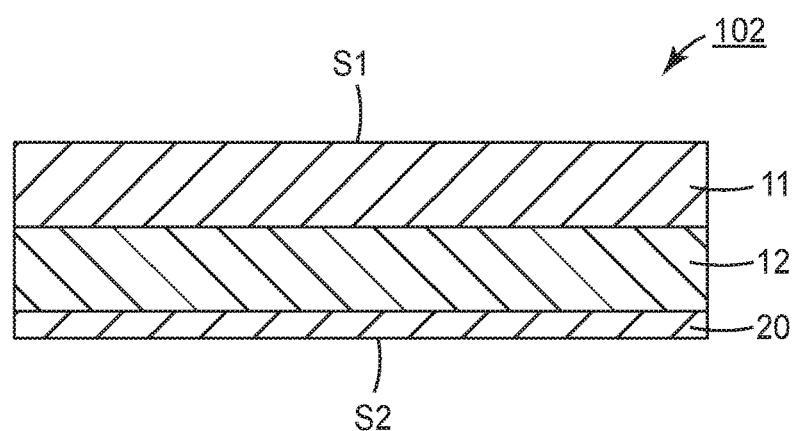
FIG. 2 is a schematic cross-sectional view of a radio-wave anti-reflection sheet including an adhesive layer, according to some embodiments.

In some embodiments, the second polymeric foam layer 12 includes the second major surface S2. In other embodiments, an additional adhesive layer is included which includes the second major surface S2. FIG. 2 is a schematic cross-sectional view of a radio-wave anti-reflection sheet 102 that may correspond to radio-wave anti-reflection sheet 101 but that further includes an (e.g., pressure-sensitive) adhesive layer 20 disposed on the second polymeric foam layer 12 and including the second major surface S2. The adhesive layer 20 can be utilized to attach the radio-wave anti-reflection sheet to a substrate surface, such as the body portion of a vehicle. Any suitable adhesive may be used, such as a pressure sensitive adhesive, or a curable adhesive. Suitable pressure sensitive adhesives include (meth)acrylate-based pressure sensitive adhesives, for example. Other examples of suitable pressure sensitive adhesives include silicone pressure sensitive adhesives. Examples of curable adhesives include both actinic radiation (e.g., ultraviolet) curable adhesives and heat curable adhesives. In some embodiments, the adhesive layer 20 has a thickness of at least 2 μm, or at least 5 μm, or at least 10 μm, for example. In some such embodiments, or in other embodiments, the adhesive layer 20 has a thickness of no more than 200 μm, or no more than 100 μm, or no more than 50 μm, for example. The thickness of the adhesive layer 20 may be small compared to the thickness of the polymeric foam layer(s) of the radio-wave anti-reflection sheet such that the adhesive layer 20 has a small or negligible effect on the radio-wave reflection reduction. In some embodiments, the thickness of the adhesive layer 20 is less than 0.2, or 0.1, or 0.075 times the thickness of the second polymeric foam layer 12.

Figure 3A:
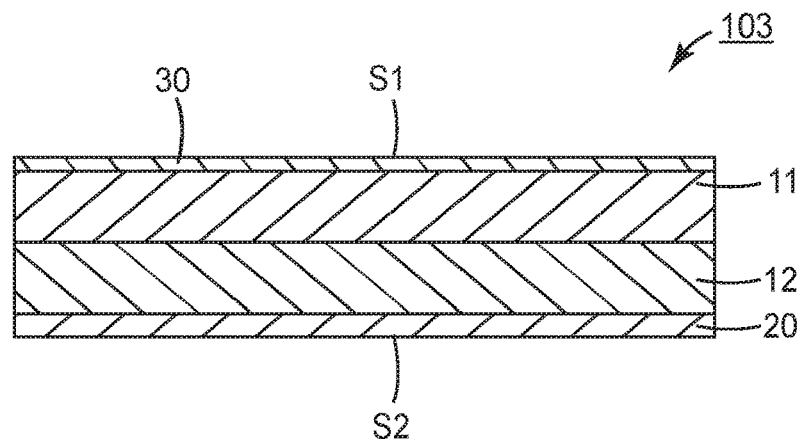
FIGS. 3A-3B are a schematic cross-sectional views of radio-wave anti-reflection sheets that include an adhesive layer and a protective layer, according to some embodiments.

In some embodiments, the first polymeric foam layer 11 includes the first major surface S1. In other embodiments, an additional layer is disposed on the first polymeric foam layer 11 and includes the first major surface S1. FIG. 3A is a schematic cross-sectional view of a radio-wave anti-reflection sheet 103 including a protective layer 30 disposed on the first polymeric foam layer 11 and including the first major surface S1. The material that forms the protective layer 30 is not particularly limited but may be a material that is tack-free at room temperature and exhibits a high level of adherence with the first polymeric layer 11. For example, the protective layer 30 may be formed from a polymethylmethacrylate (PMMA) resin. The protective layer 30 may include a silicone-based or a fluorine-based stain-preventing coating agent, for example. The thickness of the protective layer 30 may be from 0.1 to 50 μm, or from 1 to 40 μm, for example. The thickness of the protective layer 30 may be small compared to the thickness of the polymeric foam layer(s) of the radio-wave anti-reflection sheet such that the protective layer 30 has a small or negligible effect on the radio-wave reflection reduction. In some embodiments, the thickness of the protective layer 30 is less than 0.2, or 0.1, or 0.05 times the thickness of the first polymeric foam layer 11. The protective layer 30 can be formed, for example, by a method including coating the first polymeric foam layer 11 with various coating materials for forming a protective layer.

Figure 3B:
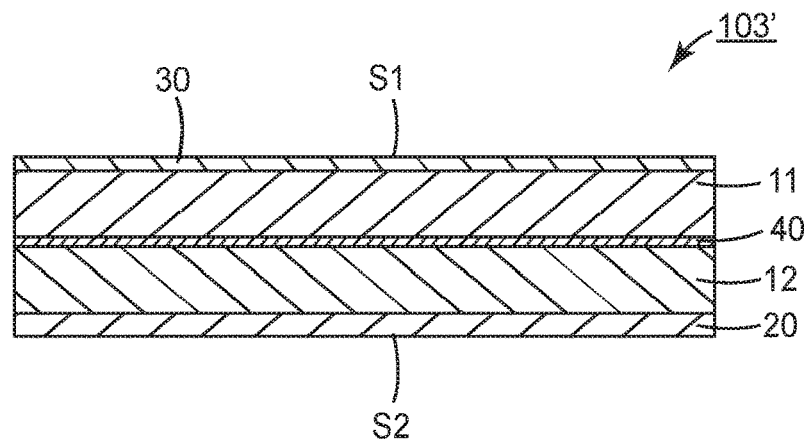

The radio-wave anti-reflection sheet can optionally include one or more additional layers. For example, the radio-wave anti-reflection sheet can include a light emitting layer disposed between the first and second major surfaces S1 and S2 and/or between layers 30 and 20 (e.g., between the first and second polymeric foam layers 11 and 12, or between layers 20 and 12, or between layers 11 and 30, for example). FIG. 3B is a schematic cross-sectional view of a radio-wave anti-reflection sheet 103' that may correspond to radio-wave anti-reflection sheet 103 except that a light emitting layer 40 is disposed between the first and second polymeric foam layers 11 and 12. The light-emitting layer can allow the radio-wave anti-reflection sheet to be easily detected from outside, for example. The light-emitting layer may include a photoluminescent material. The light-emitting layer can be formed, for example, by printing with an ink containing a photoluminescent material. The thickness of the light-emitting layer can be set within a range at which the function of reflection reduction is sufficiently maintained. For example, the thickness of the light-emitting layer may be from 1 μm to 20 μm. In some embodiments, the thickness of the light emitting layer 40 is less than 0.2, or 0.1, or 0.05 times each of the thicknesses of the first and second polymeric foam layers 11 and 12.

Figure 3C:
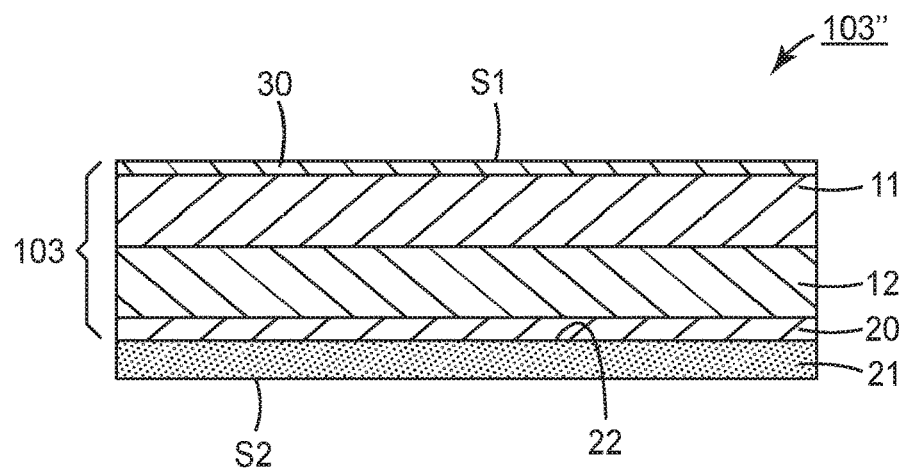
FIG. 3C is a schematic cross-sectional view of a tape including the radio-wave anti-reflection sheet of FIG. 3A disposed on a release liner, according to some embodiments.

FIG. 3C is a schematic cross-sectional view of a tape 103" including the radio-wave anti-reflection sheet 103 disposed on an optional release liner 21. More generally, a tape may include a release liner 21 and any of the radio-wave anti-reflection sheets described herein, where the second major surface S2 of the radio-wave anti-reflection sheet is disposed on a release surface 22 of the release liner 21. Release liners typically have a release coating such as a silicone coating or a fluorocarbon coating to provide the release surface. A wide range of release liners are commercially available.

Figure 4A:
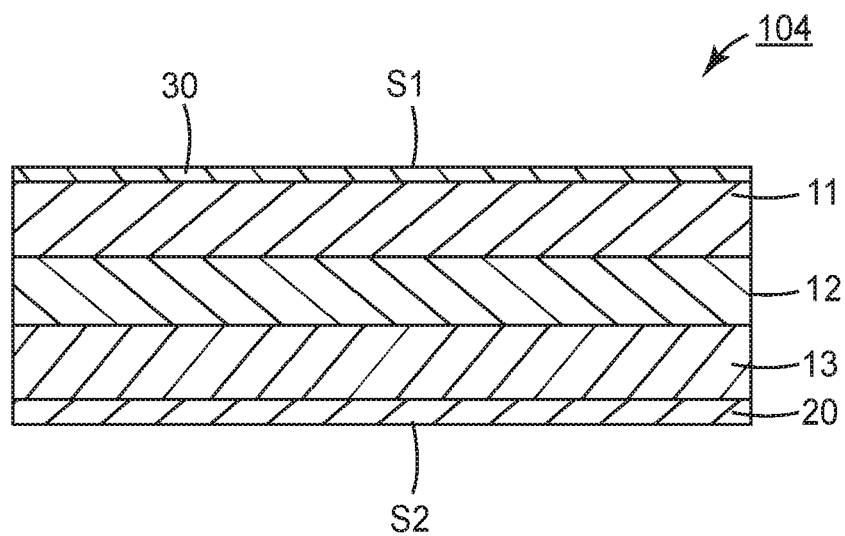
FIGS. 4A-4B are schematic cross-sectional views of radio-wave anti-reflection sheets including at least three foam layers, according to some embodiments.
Figure 4B:
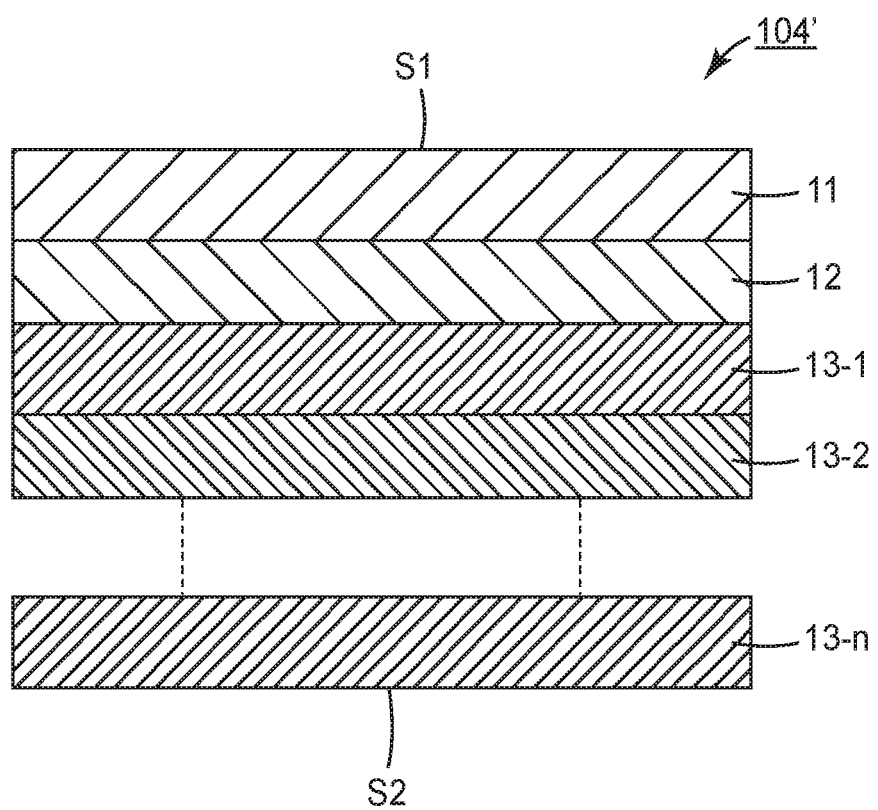

Additional polymeric foam layer(s) may optionally be included to provide additional interfaces for reflections that can further reduce the overall reflection (e.g., via destructive interference of the various reflected radio waves), and/or further increase the frequency range over which the reflection is significantly reduced, of the radio-wave anti-reflection sheet when disposed on a multilayer substrate. FIG. 4A is a schematic cross-sectional view of a radio-wave anti-reflection sheet 104 including a third polymeric foam layer 13, according to some embodiments. More generally, a radio-wave anti-reflection sheet includes at least the first and second polymeric foam layers 11 and 12 and can include any number of additional layers. FIG. 4B is a schematic cross-sectional view of a radio-wave anti-reflection sheet 104 including first and second polymeric foam layers 11 and 12 and further including a plurality of additional optional polymeric foam layers 13-1 to 13-$n$, according to some embodiments. In some embodiments, the total number of polymeric foam layers included in a radio-wave anti-reflection sheet is 2, 3, 4, or 5, for example.

Figure 5A:
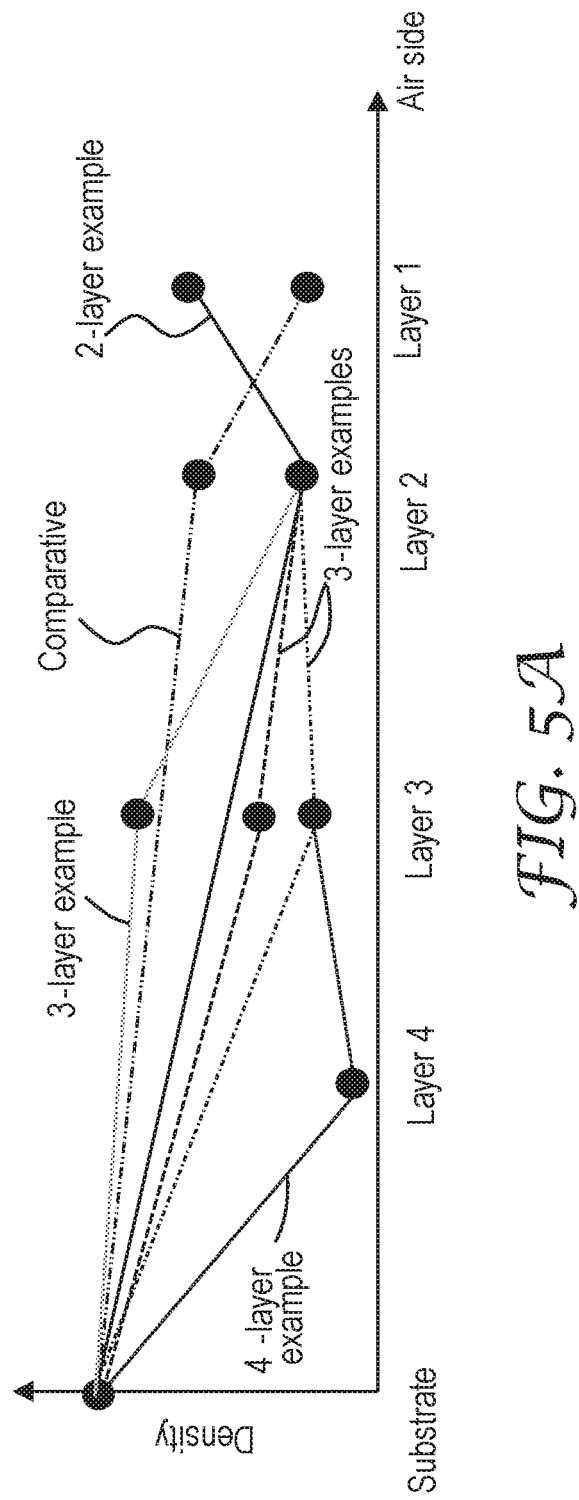
FIG. 5A is a schematic plot illustrating densities of foam layers for radio-wave anti-reflection sheets, according to some embodiments.
Figure 5B:
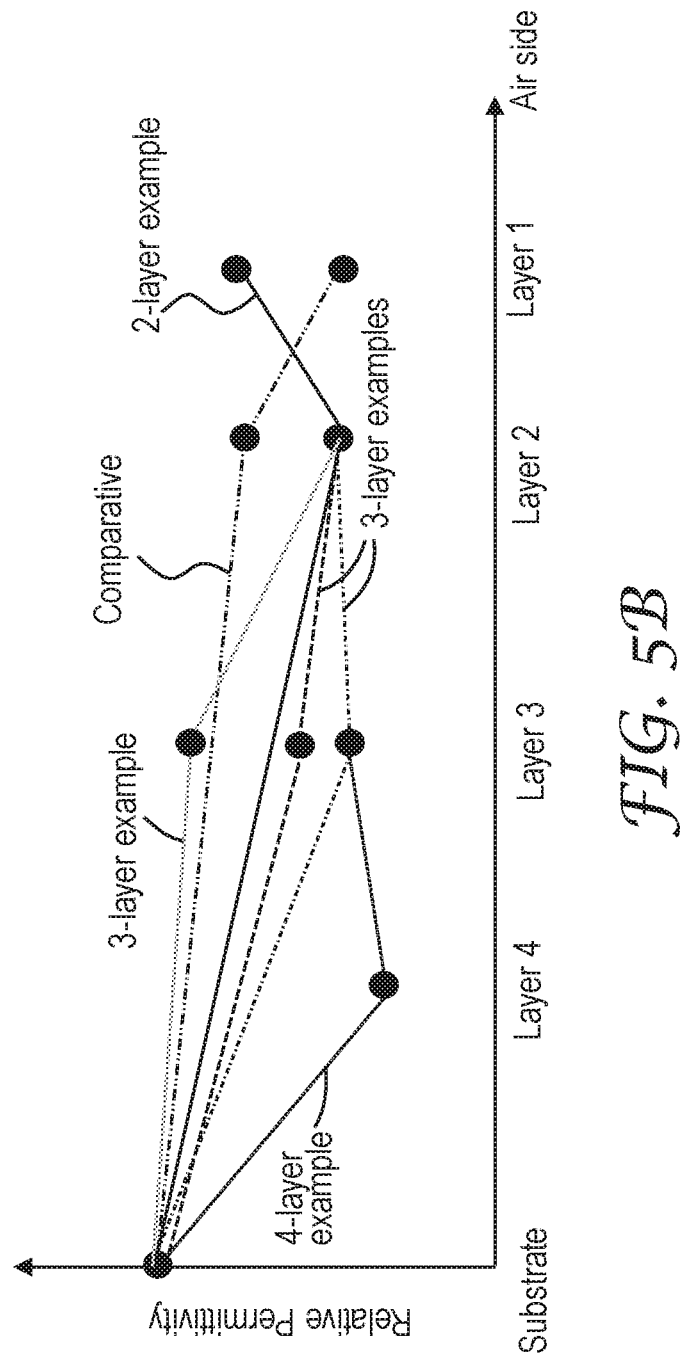
FIG. 5B is a schematic plot illustrating relative permittivities of foam layers for radio-wave anti-reflection sheets, according to some embodiments.

FIG. 5A is a schematic plot illustrating the relative densities of foam layers for radio-wave anti-reflection sheets including up to 4 layers (Layer 1 through Layer 4), according to some embodiments. A 2-layer example, three 3-layer examples, and a 4-layer example are illustrated. For comparison, a conventional 2-layer comparative example is also illustrated. The relative permittivities of the various layers may generally follow the same pattern as the densities of the various layers (e.g., a lower density foam having a same polymeric matrix as a higher density foam will also typically have a lower permittivity than that of the higher density foam). FIG. 5B is a schematic plot illustrating relative permittivities of foam layers for radio-wave anti-reflection sheets including up to + layers, according to some embodiments. The relative permittivities in FIG. 5B can be understood to be evaluated at a same frequency (e.g., in a range of 60 to 90 GHz).

In some embodiments, a radio-wave anti-reflection sheet includes a third polymeric foam layer 13 having a thickness from 0.05 to 3.0 mm, where the second polymeric foam layer 12 is disposed between the first and third polymeric foam layers 11 and 13 (or 13-1). In some embodiments, the third polymeric foam layer 13 has a density greater than the density of the second polymeric foam layer 12 and no greater than the density of the first polymeric foam layer 11. In some embodiments, the third polymeric foam layer has a density greater than the density of the first polymeric foam layer and no greater than 0.95 g/cm³. In some embodiments, the third polymeric foam layer 13 (or 13-1) has a density less than the density of the second polymeric foam layer 12 and greater than 0.05 g/cm³. In some such embodiments, or in other embodiments, the radio-wave anti-reflection sheet further includes a fourth polymeric foam layer 13-2 having a thickness from 0.05 to 3.0 mm, where the third polymeric foam layer 13-1 is disposed between the second and fourth polymeric foam layers 12 and 13-2, and where the fourth polymeric foam layer 13-2 has a density less than the density of the third polymeric foam layer 13-1 and greater than 0.05 g/cm³. In some embodiments, the third polymeric foam layer 13-1 has a density no greater than the density of the first polymeric foam layer 11, and the fourth polymeric foam layer 13-2 has a density less (e.g., by at least 0.05 g/cm³) than each of the densities of the second and third polymeric foam layers 12 and 13-1 and greater than 0.05 g/cm³. In some embodiments, the density of the third polymeric foam layer 13-1 is less (e.g., by at least 0.05 g/cm³ or by an amount in a range described elsewhere herein) than the density of the second polymeric foam layer 12. The thickness of the third and/or fourth polymeric foam layers may be in any of the ranges described elsewhere herein for a foam layer.

The polymer material of any of the polymeric foam layers (e.g., 11 or 12) may include, for example, a cured product of a curable resin composition, a thermoplastic resin, or both. The "curable resin composition" includes at least one monomer compound, and a polymer is produced by polymerization of the at least one monomer compound, and thereby the curable resin composition is cured.

A thermoplastic resin for forming the first polymeric foam layer 11 or the second polymeric foam layer 12 may be, for example, a polyolefin such as polypropylene and polyethylene, a polycarbonate, acrylonitrile ethylene styrene (AES), or acrylonitrile butadiene styrene (ABS).

A resin composition for forming a polymeric foam layer (e.g., the first polymeric foam layer 11 and/or the second polymeric foam layer 12) may include hollow particles or a foaming agent for generating gas bubbles, or both. The foaming agent that generates gas bubbles may be a thermally expanding foaming agent. The thermally expanding foaming agent may include, for example, shells containing a thermoplastic resin, and a liquid component encased in the shells. The thermally expanding foaming agent may be referred to as thermally expandable microspheres or thermally expandable microcapsules. The foaming agent that generates gas bubbles may be a chemical foaming agent. The hollow particles may be hollow glass particles or hollow resin particles, for example. When the content amount of the foaming agent that generates gas bubbles and the hollow particles is large, the percentage of gas bubbles in the polymeric foam layer increases, and as a result, the density of the foam layer is reduced. Accordingly, the density of each of the polymeric foam layers can be controlled based on the content amount of the foaming agent and/or the hollow particles. The relative permittivity may similarly vary with the percentage of foam cells (e.g., gas bubbles) in the polymeric foam layer. Accordingly, the relative permittivity of each of the polymeric foam layers can be controlled based on the content amount of the foaming agent and/or the hollow particles. The polymeric foam layers may further contain, as desired, other components such as a dispersant.

Suitable glass microspheres include hollow glass bubbles such as those available from 3M Company (St. Paul. MN), for example. Expandable microspheres (which can be expanded by the application of heat in forming the foam layer) may include a shell formed from a thermoplastic resin, and a low boiling point liquid hydrocarbon encased in the shell. Suitable expandable microspheres include those available form Kureha Corporation, those available from Matsumoto Yushi-Seiyaku Co., Ltd., and those available from Nouryon under the trade name EXPANCEL. Microspheres are generally spherical and have a diameter less than about 1 mm and typically greater than about 1 micrometer. In some embodiments, microspheres have a median particle diameter of 1 to 200 micrometers, or 5 to 150 micrometers, for example.

The term "(meth)acrylate monomer" refers to monomeric acrylic or methacrylic esters of alcohols. Acrylate and methacrylate monomers or oligomers or polymers are referred to collectively herein as "(meth)acrylates". A (meth)acrylate composition may contain at least one (meth)acrylate monomer and may contain additional (meth)acrylate or non-(meth)acrylate co-polymerizable ethylenically unsaturated monomers. A majority (that is to say, greater than 50% by weight) of a (meth)acrylate may be composed of (meth)acrylate monomers. Suitable materials for the first and/or second polymeric foam layers and/or other polymeric foam layer(s) include a (meth)acrylate matrix; and hollow microspheres dispersed in the matrix. In some embodiments. (at least) the second polymeric foam layer includes a (meth) acrylate matrix; and hollow microspheres dispersed in the matrix. The hollow microspheres can include hollow glass microspheres and/or polymer (e.g., expanded) microspheres, for example.

The terms "Tg" and "glass transition temperature" are used interchangeably. If measured. Tg values are determined by Differential Scanning calorimetry (DSC) at a scan rate of 10° C./minute, unless otherwise indicated. Typically. Tg values for (meth)acrylate copolymers are not measured but are calculated using the well-known Fox Equation, using the homopolymer Tg values provided by the monomer supplier, as is understood by one of ordinary skill in the art. The homopolymer Tg values can be measured for monomers that are not commercially available, for example. In some embodiments, the (meth)acrylate matrix includes 2% by weight or less acidic content and has a Tg of −35° C., or greater, or −25° C., or greater. The Tg of the (meth)acrylate matrix may be up to 50° C., or up to 40° C., for example. (Meth)acrylates having a Tg in a range of −35° C., to 50° C., for example, may have desired properties such as low water vapor transmission rates, for example. However, in other embodiments, the Tg may be less than −35° C., or greater than 50° C. The Tg can be adjusted by a suitable selection of monomers in a (meth)acrylate composition for the matrix, as is understood by one of ordinary skill in the art.

In some embodiments, at least one polymeric foam layer (e.g., the first and/or the second polymeric foam layer) is hydrophobic. A foam layer can be made hydrophobic by choosing hydrophobic monomers in a (meth)acrylate composition, for example, for the matrix, as is understood by one of ordinary skill in the art. The hydrophobicity of a foam layer or of the radio-wave anti-reflection sheet can be measured in a variety of ways, typically it is measured by exposure to controlled conditions of heat and humidity for certain periods of time and determining the amount of water absorption. In some embodiments, a foam layer or the radio-wave anti-reflection sheet has a water absorption of less than 9000 ppm, or less than 7400 ppm, or less than 5000 ppm after 24 hours at 85° C., and 85% Relative Humidity.

Related foam layers having a matrix with a Tg of −25° C., or greater and/or having a water absorption of less than 7400 ppm after 24 hours at 85° ° C., and 85% Relative Humidity are described in International Application No. IB2021/052188 filed Mar. 16, 2021. Other related foam layers are described in International Application No. IB2021/052189 filed Mar. 16, 2021.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

In some embodiments, the (meth)acrylate for a polymeric foam layer (e.g., layer 11 and/or layer 12) is prepared by providing a reaction mixture including at least two (meth) acrylate monomers, optionally 2% or less by weight of acidic (meth)acrylate monomer, and at least one initiator. In some embodiments, the (meth)acrylate monomers may be selected to give a polymer with a Tg that is −35° C., or greater, or −25° C., or greater. A wide range of (meth) acrylate monomers are suitable for use in the reaction mixture. Typically, the (meth)acrylate monomers are alkyl or aryl (meth)acrylate monomers where the alkyl or aryl group of the (meth)acrylate has an average of 1 to 20 carbon atoms. Since the reaction mixture can include at least two (meth)acrylate monomers, a wide variety of combinations are suitable. Typically, the reaction mixture includes a first (meth)acrylate monomer with a relatively low homopolymer Tg and a second (meth)acrylate monomer with a relative higher homopolymer Tg. Generally, the first (meth)acrylate monomer has an alkyl group with about 4 to about 18 or to about 14 carbon atoms and have a homopolymer Tg that is 0° C., or lower. Examples include, but are not limited to, butyl acrylate, isooctyl acrylate, lauryl acrylate, iso-stearyl acrylate. 4-methyl-2-pentyl acrylate, isoamyl acrylate, sec-butyl acrylate, n-hexyl acrylate. 2-ethylhexyl acrylate, n-octyl acrylate, n-decyl acrylate, isodecyl acrylate, isodecyl methacrylate, and isononyl acrylate. Generally, the second (meth)acrylate monomer is an alkyl or aryl (meth)acrylate that has a homopolymer Tg that is above 0° C., often above 10° C. Examples include, but are not limited to methyl acrylate, methyl methacrylate, isobornyl acrylate, biphenylyl acrylate, t-butylphenyl acrylate, cyclohexyl acrylate. 4-tert-butylcyclohexyl acrylate, cyclic trimethylolpropane formal acrylate, dicyclopentanyl acrylate, dicyclopentenyl acrylate, dicyclopentenyl oxyethyl acrylate, dimethyladamantyl acrylate. 2-naphthyl acrylate, phenyl acrylate. N,N-dimethyl acrylamide. N,N-diethyl acrylamide, acryloyl morpholine. N-hydroxyethyl acrylamide. N-isopropyl acrylamide. N,N-dimethylamino propylacrylamide. N-vinyl pyrrolidone. N-vinyl caprolactam. If a hydrophobic (meth) acrylate is desired and if a hydrophilic monomer is used as the second (meth)acrylate monomer, the amount of such monomer is typically less than 10%, more typically less than 5% so that the copolymer retains its hydrophobic nature. Optionally, the reaction mixture may also include up to 2% by weight, for example, of an acid-functional monomer. Examples of acid-functional monomers include acrylic acid, methacrylic acid, and itaconic acid. The reaction mixture also typically includes at least one initiator. Typically, the initiator or initiators include photoinitiators, meaning that the initiator is activated by light, typically ultraviolet (UV) light. Examples of suitable free radical photoinitiators include DAROCURE 4265, IRGACURE 184, IRGACURE 651, IRGACURE 1173, IRGACURE 819, LUCIRIN TPO, LUCIRIN TPO-L, commercially available from BASF. Charlotte, NC. Generally, the photoinitiator is used in amounts of 0.01 to 1 part by weight relative to 100 parts by weight of total reactive components.

In some embodiments, a curable resin composition for forming a polymeric foam layer (e.g., layer 11 and/or layer 12) may include a monomer compound having one or more (meth)acryloyl groups. The cured product of the monomer compound having a (meth)acryloyl group includes an acrylic resin formed by polymerization of the monomer compound. Examples of monomer compounds having a (meth)acryloyl group include alkyl (meth)acrylates. (meth) acrylic acids, and aryl (meth)acrylates. The number of carbon atoms in the alkyl group contained in the alkyl (meth)acrylate may be from 1 to 18 or from 1 to 14. Specific examples of alkyl (meth)acrylates include methyl (meth) acrylate, ethyl (meth)acrylate, n-propyl (meth)acrylate, isopropyl (meth)acrylate, n-butyl (meth)acrylate, tert-butyl (meth)acrylate, isobutyl (meth)acrylate, n-pentyl (meth)acrylate, n-hexyl (meth)acrylate, cyclohexyl (meth)acrylate, n-heptyl (meth)acrylate, n-octyl (meth)acrylate, isobornyl (meth)acrylate, and 2-ethylhexyl (meth)acrylate. The content of the monomer compound having a (meth)acryloyl group may be from 80 to 100 mass % based on the mass of the curable resin composition. When the content of the monomer compound having a (meth)acryloyl group is 100 mass %, a foam layer can be formed, for example, by mechanical foaming (foaming through an inflow of an inert gas such as nitrogen). The curable resin composition containing a monomer compound having a (meth)acryloyl group may further include a photopolymerization initiator, a thermal polymerization initiator, or both.

The reactive composition components can be mixed by traditional methods known to those skilled in the art. Such methods include mixing, mechanical rolling, hot melt blending, etc. The reactive mixture may then partially polymerized by exposure to UV radiation to give a curable, coatable syrup as described in, for example, U.S. Pat. No. 6,339,111 (Moon, et al.). Because the reaction mixture is only partially polymerized, the resultant coatable syrup remains a curable composition. Foaming agents, hollow particles, and/or expandable microspheres and additional initiator can be dispersed into the curable, coatable syrup to form a filled curable, coatable syrup. The additional initiator may be same initiator as was used to achieve partial polymerization or it may be a different initiator. Generally, the photoinitiator is used in amounts of 0.01 to 1 parts by weight, more typically 0.1 to 0.5, parts by weight relative to 100 parts by weight of total reactive components.

The filled curable, coatable syrup may then be coated on a first release liner to form a curable layer using any suitable coating technique. The thickness of the curable layer can vary greatly, typically it is 0.02-2.5 millimeters. The filled curable, coatable layer may be covered with a second release liner to form a curable layer between two release liners. The second release liner may be the same as or different from the first release liner. The second release liner may be added after the curable, coatable layer is formed or it may be added as the coating is formed. In some embodiments, the syrup is coated onto the first release liner and the second release liner is simultaneously contacted to the top surface of the coating. The curable layer between two release liners can then be polymerized to form a filled, cured polymeric (e.g., (meth) acrylate) matrix. Typically, the curable layer is cured by exposure to ultraviolet (UV) radiation. In embodiments, where expandable microspheres are included, the cured layer can then be exposed to elevated temperatures to expand the expandable microspheres to form a foam layer. Typically, the cured layer is placed in an oven to expand the expandable microspheres, in this case. The temperature and time to which the cured layer is exposed depends upon the nature of the expandable microspheres used and the level of microspheres present. In other embodiments, hollow particles (e.g., hollow glass microspheres) are included in the syrup and the elevated temperature step may be omitted.

In some embodiments, after a first foam layer is formed, a second foam layer is formed by coating, and subsequently curing, a second filled curable, coatable syrup on the first foam layer. In other embodiments, two foam layers are formed separately and then joined together (e.g., one of the foam layers can be tacky to provide bonding between the layers or a separate adhesive layer that may be substantially thinner than the foam layers may be used). In some embodiments, each polymeric foam layer of a radio-wave anti-reflection sheet is a foam layer described elsewhere herein (e.g., formed using at least one of the techniques described herein). In some embodiments, at least one polymeric foam layer (e.g., the lowest density layer) is formed using the techniques described herein and at least one other polymeric foam layer (e.g., a higher density layer) is prepared by different methods. The foam layer prepared by different methods may be an acrylic foam tape such as Acrylic Foam Tape Series PX5000 available from 3M Company. St. Paul. MN, for example. In some embodiments, the foam layer prepared by different methods may be a commercially available foam construction such as a polypropylene foam.

Figure 6A:
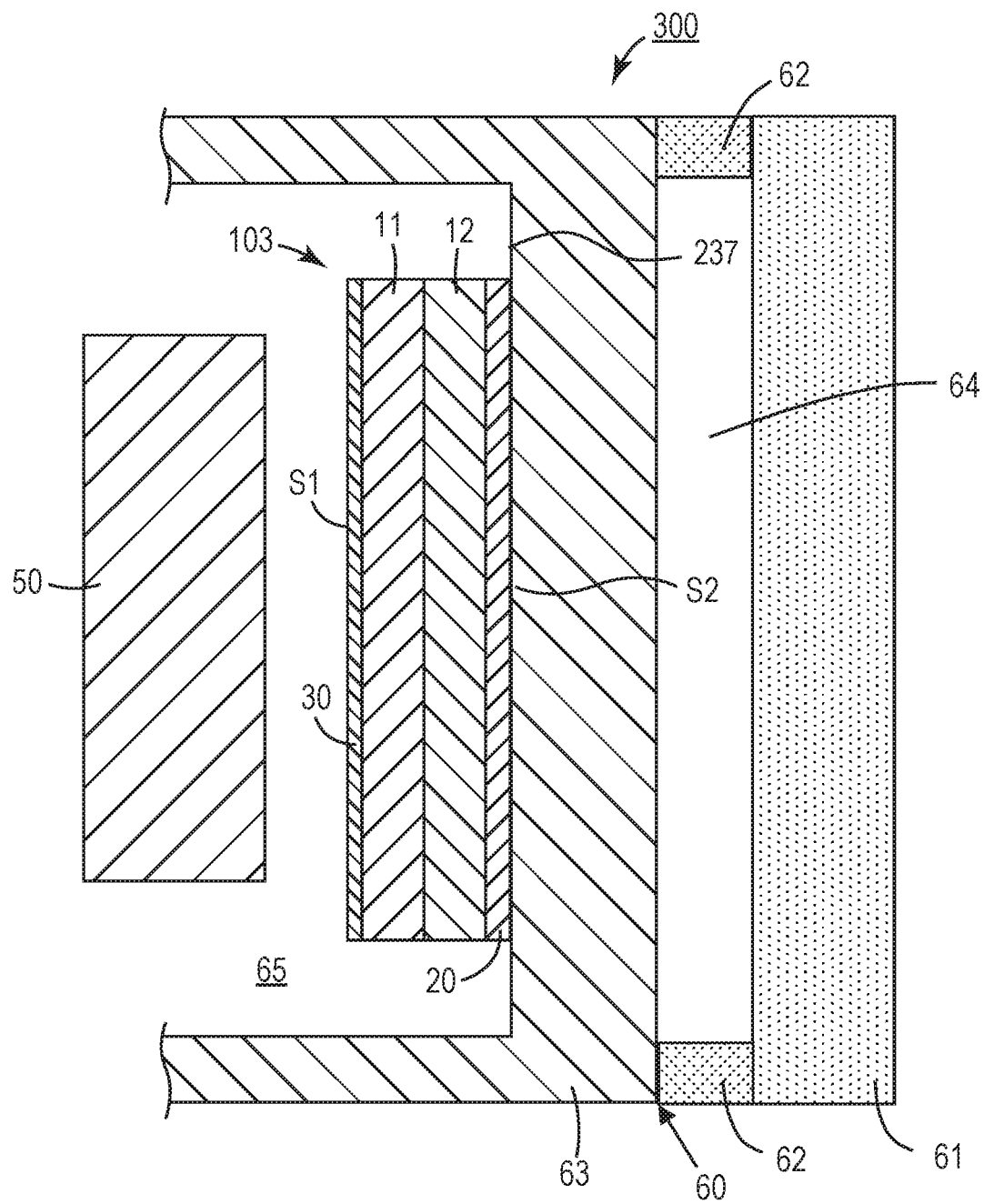
FIGS. 6A-6B are schematic cross-sectional views of a vehicle member including a radio-wave anti-reflection sheet, according to some embodiments.
Figure 6B:
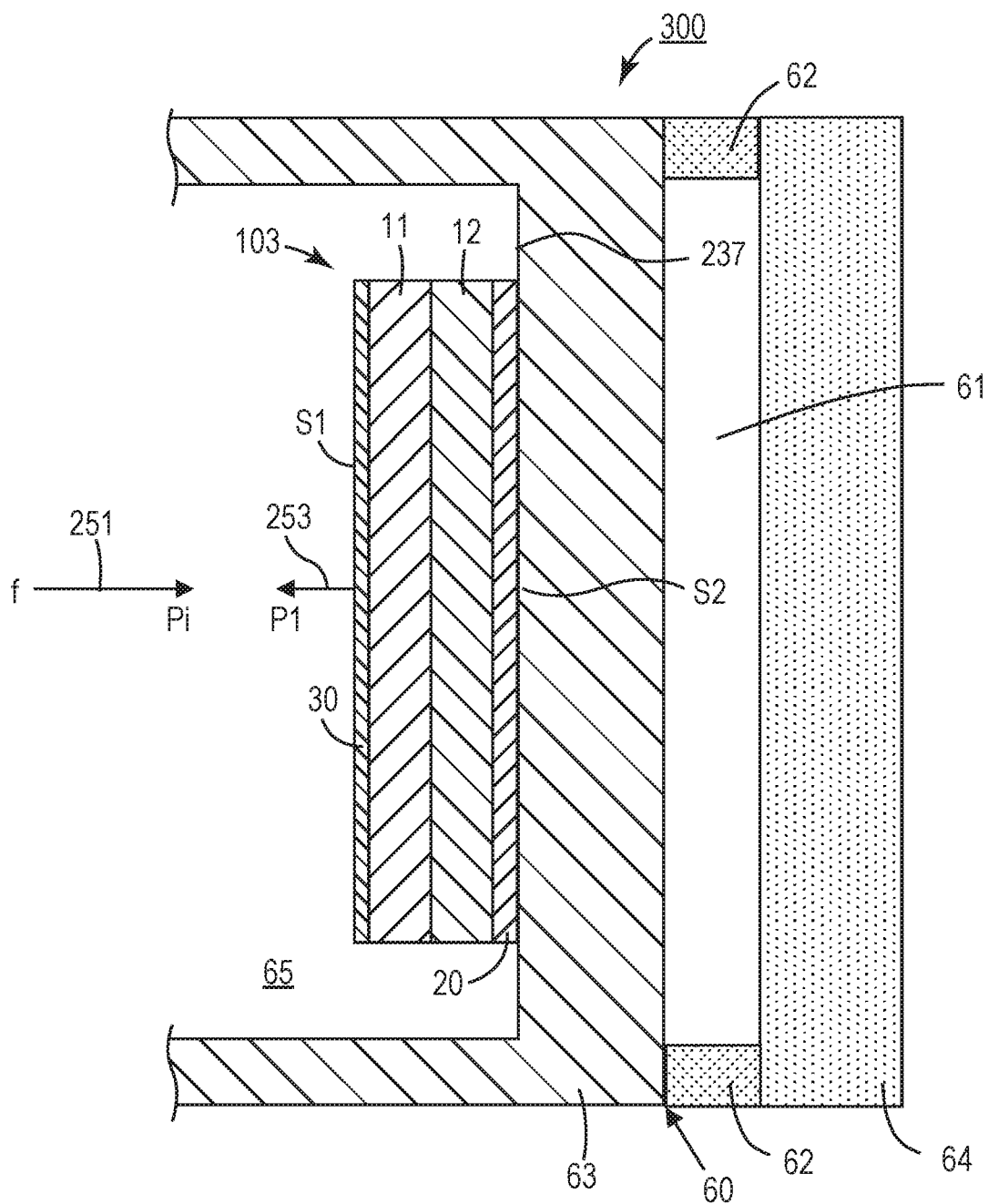

FIGS. 6A-6B are schematic cross-sectional views of a vehicle member 300, according to some embodiments. The vehicle member 300 includes a multilayer body portion 60 including a first layer 61 disposed between second and third layers 63 and 64, where the first layer 61 has a lower density than each of the second and third layers 63 and 64 and/or a lower relative permittivity that each of the second and third layers 63 and 64 for at least one frequency in a range of 60 to 90 GHz. For example, the first layer 61 can be an air layer while each of the second and third layers 63 and 64 can be polymeric layers. The layers 62 may be spacer layers holding the second and third layers 63 and 64 apart. In some embodiments, each of the second and third layers 63 and 64 has a density of at least 1.1 g/cm³ and the first layer 61 has a density less than each of the densities of the second and third layers 63 and 64 by at least 0.2 g/cm³ or at least 0.3 g/cm³. In some embodiments, each of the second and third layers 63 and 64 has a relative permittivity of at least 2 for at least a first frequency in a range of 60 to 90 GHz and the first layer 61 has a relative permittivity less than each of the relative permittivities of the second and third layers 63 and 64 by at least 0.5 for at least the first frequency. In some embodiments, the first layer 61 has a relative permittivity of less than 1.2, or less than 1.1, or less than 1.05 for at least a first frequency in a range of 60 to 90 GHz. In some embodiments, the first layer 61 is an air layer, an emblem or another vehicle fascia is disposed in the air layer (e.g., on a surface of layer 63), and the third layer 64 is optically transparent. In some embodiments, an average thickness of the first layer 61 is less than 0.5 mm, or less than 0.3 mm, and may be greater than 0.05 mm, for example. In some embodiments, an average thickness of the first layer 61 is less than each of the thickness of the first and second polymeric foam layers 11 and 12, or less than half of each of the thickness of the first and second polymeric foam layers 11 and 12, or less than a third of each of the thickness of the first and second polymeric foam layers 11 and 12, for example.

The vehicle member 300 includes a radio-wave anti-reflection sheet of the present description where the second major surface S2 of the radio-wave anti-reflection sheet is disposed on, and bonded to, an outermost major surface 237 of the multilayer body portion 60. In the illustrated embodiment, the radio-wave anti-reflection sheet 103 is disposed on the multilayer body portion 60. In other embodiments, a different one of the radio-wave anti-reflection sheets described herein is used. In the illustrated embodiment, the body portion 60 forms an accommodation chamber 65 in which a radar device 50 (see FIG. 6A) can be installed. FIG. 6B schematically illustrates radio waves 251 incident on the first major surface S1 and reflected radio waves 253.

Figure 7A:
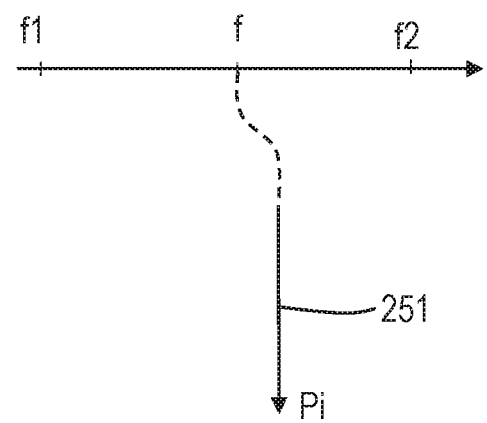
FIG. 7A is a schematic cross-sectional view of radiation incident on an illustrative metal surface.
Figure 7A:
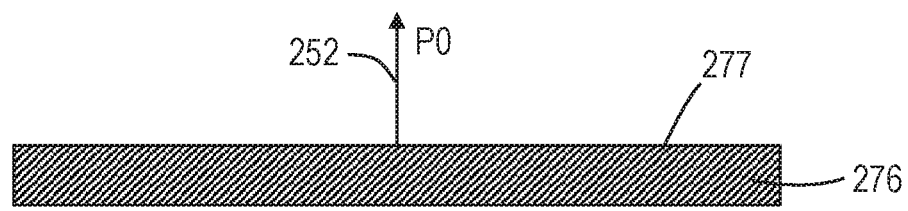
Figure 7B:
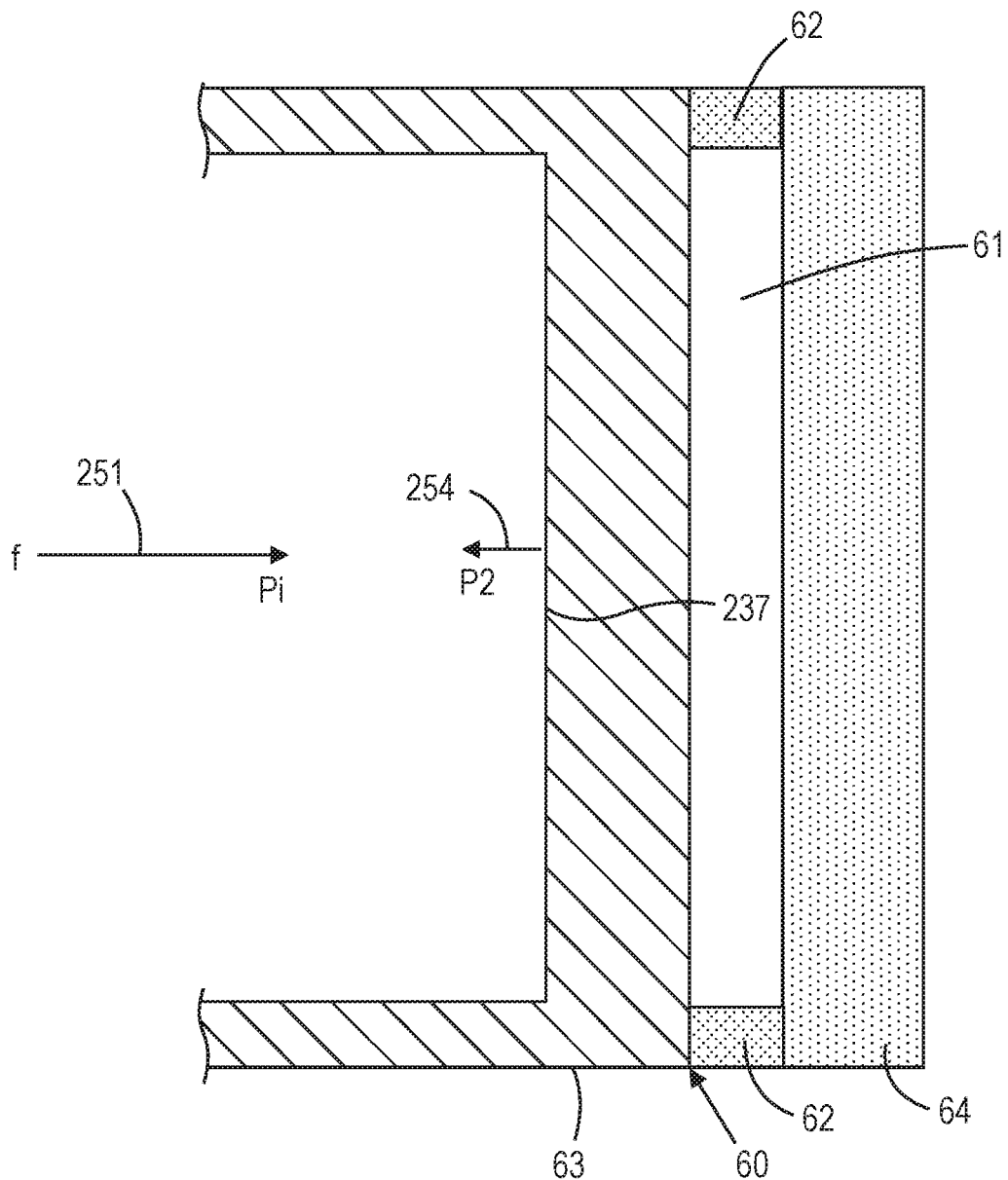
FIG. 7B is a schematic cross-section view of radiation incident on an illustrative vehicle member not including a radio-wave anti-reflection sheet.

FIGS. 7A-7B are schematic cross-sectional views illustrating reflection of radio waves from references articles, according to some embodiments. In FIG. 7A, the reference article is a flat metal plate 276 having a metal surface 277.

The metal plate 276 can be an aluminum plate, for example, and may have a thickness of about 3 mm, for example. In FIG. 7B, the reference article is the multilayer body portion 60 without the radio-wave anti-reflection sheet. The radio waves 251 have a frequency f in a range of f1 to f2. In some embodiments, f1 is 60 GHz or 70 GHz. In some such embodiments, or in other embodiments, f2 is 90 GHz or 85 GHz. In some embodiments, the frequency f is in a range of 60 to 90 GHz or 70 to 85 GHz, for example.

In some embodiments, a strength of radio waves 253 reflected by the radio-wave anti-reflection sheet and the multilayer body portion is P1 (see FIG. 6B) when irradiated with radio waves 251 having a first strength P1 and a first frequency f in a range of 60 to 90 GHz in a direction perpendicular to the first major surface S1 from the first major surface side, where a strength of radio waves 252 reflected by a flat metal surface 277 is P0 when the metal surface 277 is irradiated with radio waves 251 having the first strength P1 and the first frequency f in a direction perpendicular to the metal surface. In some embodiments, P1-P0 is less than −15 dB, or less than −30 dB, or less than −40 dB, for example. P1-P0 may be as low as −80 dB or −60 dB, for example. In some embodiments, a strength of radio waves 254 reflected by the multilayer body portion 60 is P2 when the radio-wave anti-reflection sheet is removed from the multilayer body portion 60 and the multilayer body portion is irradiated with radio waves 251 having the first strength P1 and the first frequency f in a direction perpendicular to the outermost major surface 237 from the radio-wave anti-reflection sheet side (i.e., the side of the multilayer body portion 60 where the radio-wave anti-reflection sheet was located before it was removed). In some embodiments, P1-P2 is less than −3 dB, or less than −5 dB, or less than −10 dB, or less than −15 dB, for example. P1-P2 can be as low as −40 dB or −35 dB, for example. In some embodiments, the radio-wave anti-reflection sheet reduces a reflection of radio waves having a first frequency f in a range of 60 to 90 GHz and substantially normally incident on the multilayer body portion by at least 3 dB, or by at least 5 dB, or at least 10 dB, or at least 15 dB, for example, and in some embodiments, by up to 40 dB or up to 35 dB, for example.

Examples

These examples are merely for illustrative purposes only and are not meant to be limiting on the scope of the appended claims. All parts, percentages, ratios, etc, in the examples and the rest of the specification are by weight, unless noted otherwise.

TABLE 1

| Materials | | |
|---|---|---|
| Abbr./Product name | Type/Generic name | Description |
| IBOA | Monomer | Isobornyl acrylate available from Osaka Organic Chemical Industry. |
| IRGACURE 651 | Photo initiator | 2,2-Dimethoxy-1,2-diphenylethan-1-one available from IGM Resins B.V. |
| REGALREZ 6108 | Resin | Hydrocarbon resin produced by polymerization and partial hydrogenation of pure monomer hydrocarbon feedstocks, available from Eastman Chemical Japan. |
| K-15 | Glass Bubble | Hollow glass microspheres whose density is 0.15 g/cm$^3$, available from 3M Company. |
| FILMBYNA MIB(50 μm) | Liner | Both side silicone treated polyester liner, whose thickness is 0.050 mm, available from FUJIMORI KOGYO CO., LTD. |
| PUREX A50 | Liner | One side silicone treated polyester liner, whose thickness is 0.050 mm, available from TOYOBO CO., LTD. |
| 2EHA | 2-ethylhexyl acrylate | available from Nippon Shokubai Co., Ltd. |
| AA | Acrylic acid | available from Toagosei Co. Ltd. |
| HDDA | 1,6-hexanediol diacrylate | Light Acrylate 1.6HX-A, available from Kyoeisha Chemical Co. Ltd. |

0.150 gram of IRGACURE 651, 306.9 gram of 2EHA, 3.05 gram of AA, 96.75 gram of IBOA, and 96.34 gram of REGALREZ 6108 were weighed and put in a 900 mL glass jar, then put on a roller mixer for overnight until REGALREZ 6108 was completely dissolved into the monomer mixture. Oxygen gas was purged out by bubbling nitrogen gas in the monomer mixture for 15 minutes, then 360 nm black light lamp was turned on to irradiate UV light to the 900 mL glass jar for 30 seconds. A viscous syrup containing polymer was obtained. After the pre-polymerization, 0.785 gram of IRGACURE 651 and 0.626 gram of HDDA were added to the 900 mL glass jar and the jar was again put on the roller mixer for overnight.

The amounts of syrup prepared as described above and K-15 indicated in Table 2 were added to a 150 mL plastic cup and mixed by the Planetary Centrifugal Mixer at 2000 rpm rotation for 2 minutes.

The syrup was poured between the two liners (PUREX A50 and FILMBYNA MIB (50 μm)) on a coating line where the coater head was set to a gap selected to result in the thickness given in Table 2. The composition was then exposed to a UV light source in a UV chamber until polymerization of the acrylate monomer mixture into an acrylate polymer was complete. The glass transition temperature of the acrylate polymer was calculated to be −30.5° C., based on the Fox equation. The thickness of the resulting acrylic foam was measured at 4 points across the sheet by a thickness gage (Mitutoyo, Code No. 543-390), and recorded. The average thickness is shown in Table 2. The density was measured using an MDS-300 densimeter (AlfaMirage Co. Ltd., Osaka, Japan) and is shown in Table 2. Relative permittivity was determined using a KEYCOM Version 1.2.2 permittivity analyzer (KEYCOM Corporation, Tokyo, Japan) and is shown in Table 2.

TABLE 2

| Layer | Syrup [g] | K-15 [g] | Thickness [mm] | Density [g/cm³] | Relative Permittivity |
|---|---|---|---|---|---|
| 1-2 | 293.4 | 27.5 | 0.30 | 0.701 | 1.955 |
| 1-3 | 293.4 | 27.5 | 0.40 | 0.703 | 1.955 |
| 1-4 | 293.4 | 27.5 | 0.90 | 0.701 | 1.955 |
| 2-2 | 330.9 | 55.7 | 0.30 | 0.559 | 1.735 |
| 2-4 | 330.9 | 55.7 | 0.20 | 0.556 | 1.734 |
| 3 | 165.9 | 34.1 | 0.80 | 0.554 | 1.700 |
| 4 | 192.8 | 7.2 | 0.40 | 0.849 | 2.200 |
| 5-2 | 111.7 | 16.7 | 0.45 | 0.596 | 1.750 |
| 6 | 93.0 | 7.0 | 0.30 | 0.727 | 2.015 |
| 7 | 84.3 | 15.7 | 0.45 | 0.556 | 1.707 |

Various radio-wave anti-reflection sheets were made from the layers of Table 2 as indicated in Table 3. The layer stack notation in Table 3 is such that Example 2, for example, included, in sequence, a Layer 1-2, a Layer 2-2, and a Layer 3. Reflection levels for a frequency of 77 GHz and average reflection levels in a frequency range of 76 to 77 GHz are also shown in Table 3. The reflection levels are for substantially normally incident radiation and are relative to reflection from a metallic (3 mm thick aluminum) plate.

TABLE 3

| Example No. | Layer Stack L1/L2 . . . | Reflection Level[dB]*[1] | Reflection Level[dB]*[2] |
|---|---|---|---|
| CE1 | 5-2/1-4 | −17.5 | −20.7 |
| CE2 | 3/2-2/1-2 | −15.1 | −17.8 |
| CE3 | 7/2-4/5-2/6 | −15.4 | −18.4 |
| 1 | 1-4/5-2 | −17.0 | −23.0 |
| 2 | 1-2/2-2/3 | −15.9 | −20.4 |
| 3 | 4/5-2/1-3 | −17.4 | −23.0 |
| 4 | 1-3/5-2/4 | −16.6 | −18.5 |
| 5 | 6/5-2/2-4/7 | −15.2 | −19.2 |

*[1]Difference from metallic plate reflection at 77 GHz.
*[2]Mean of reflection from 76-77 GHz from the metallic plate.

Table 4 schematically summarizes the densities (high (H), medium (M), low (L), and lowest (LL)) of the layers of various Examples and Comparative Examples and shows results for the average reduction in reflection in dB over a frequency range of 76 to 77 GHz when the radio-wave anti-reflection sheet was placed on a 3-layer substrate including an 0.1 mm thick air layer between two polycarbonate layers. The polycarbonate layer facing the radio-wave anti-reflection sheet had a thickness of 2.8 mm and the other polycarbonate layer had a thickness of 3.0 mm. The polycarbonate layers were spaced apart using metal spacers near edges of the layers. The average reflection from the 3-layer substrate in the frequency range of 76 to 77 GHz was −17.1 dB relative to reflection from an aluminum plate having a thickness of about 3 mm. Layers 1 through 4 were ordered from the air side to the substrate side as schematically illustrated in FIGS. 5A-5B.

The following condition and measuring devices were applied for measuring the strength of the reflected radio wave by the S parameter method:

Network Analyzer: PNAX N5242B (Keysight)
TX UNIT: MEX6090-X6 (Microwave factory)
LO/IF Power unit: MLI UNIT SER.193679 (Microwave factory)
Frequency extender: MEX6090-X6 SER.193680 (Microwave factory)
Horn Antenna: MSGH12-25 (WR-12) (Microwave factory)
Wave guide(Twist): WR-12 1inch 45 deg Left/Right hand (Microwave factory)
Mixer: FS-Z90 (Rhode & Schwartz)
RF cable: SUCOFLEX 221 (Tx/Rx)/322(NA) (HUBER & SUHNER)

The 2-layer Example 1 showed substantial reduction compared to the 2-layer Comparative Example CE1. The 3-layer Examples 2 through 4 showed substantial reduction compared to the 3-layer Comparative Example CE2. The 4-layer Example 5 showed substantial reduction compared to the 4-layer Comparative Example CE3.

TABLE 4

| Layer | CE1 | Ex. 1 | CE2 | Ex. 2 | Ex. 3 | Ex. 4 | CE3 | Ex. 5 |
|---|---|---|---|---|---|---|---|---|
| 1 | Low | High | Low | High | High | Mid | Lowest | High |
| 2 | High | Low | Mid | Mid | Low | Low | Low | Mid |
| 3 | N/A | N/A | High | Low | Mid | High | Mid | Low |
| 4 | N/A | N/A | N/A | N/A | N/A | N/A | High | Lowest |
| Avg. Reduc. (dB) 76-77 GHz | 3.53 | 5.89 | 0.62 | 3.24 | 5.84 | 1.41 | 1.25 | 2.01 |

Figure 8:
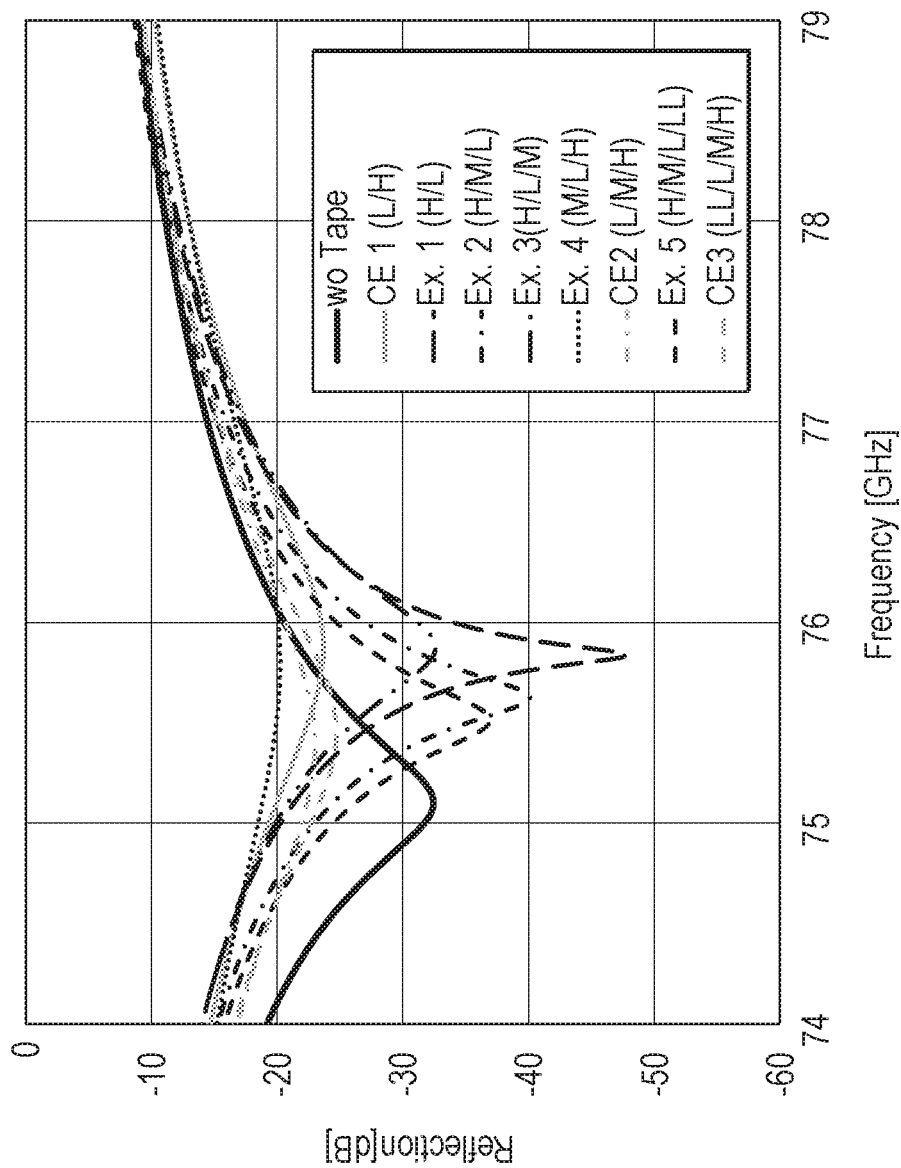
FIG. 8 is a plot of reflection versus frequency for a 3-layer substrate with and without various radio-wave anti-reflection sheets disposed on the 3-layer substrate.

FIG. 8 is a plot of reflection versus frequency for the 3-layer substrate with and without (wo Tape) various radio-wave anti-reflection sheets disposed on the 3-layer substrate where the reflection is for substantially normally incident radiation and is relative to reflection from a metallic (3 mm thick aluminum) plate.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A vehicle member, comprising:
   a multilayer body portion comprising a first layer disposed between second and third layers, the first layer having a lower density than each of the second and third layers; and
   a radio-wave anti-reflection sheet, comprising:
      a substantially non-tacky first major surface and an opposing substantially tacky second major surface;
      a first polymeric foam layer disposed between the first and second major surfaces and having a thickness from 0.05 to 3.0 mm and a density from 0.20 to 0.90 g/cm$^3$; and
      a second polymeric foam layer disposed between the second major surface and the first polymeric foam layer and having a thickness from 0.05 to 3.0 mm and a density greater than 0.10 g/cm$^3$ and less than the density of the first polymeric foam layer,
   wherein the second major surface of the radio-wave anti-reflection sheet is disposed on, and bonded to, an outermost major surface of the multilayer body portion, and
   wherein the radio-wave anti-reflection sheet reduces a reflection of radio waves having a frequency in a range of 60 to 90 GHz and substantially normally incident on the multilayer body portion by at least 3 dB.

2. The vehicle member of claim 1, wherein a difference between the densities of the first and second polymeric foam layers is greater than 0.05 g/cm$^3$.

3. The vehicle member of claim 1, wherein the first polymeric foam layer comprises the first major surface.

4. The vehicle member of claim 1 further comprising a protective layer disposed on the first polymeric foam layer and comprising the first major surface.

5. The vehicle member of claim 1, wherein the second polymeric foam layer comprises the second major surface.

6. The vehicle member of claim 1 further comprising a pressure-sensitive adhesive layer disposed on the second polymeric foam layer and comprising the second major surface.

7. The vehicle member of claim 1 further comprising a third polymeric foam layer having a thickness from 0.05 to 3.0 mm, the second polymeric foam layer disposed between the first and third polymeric foam layers.

8. The vehicle member of claim 7, wherein the third polymeric foam layer has a density greater than the density of the second polymeric foam layer and no greater than the density of the first polymeric foam layer.

9. The vehicle member of claim 7, wherein the third polymeric foam layer has a density greater than the density of the first polymeric foam layer and no greater than 0.95 g/cm$^3$.

10. The vehicle member of claim 7, wherein the third polymeric foam layer has a density less than the density of the second polymeric foam layer and greater than 0.05 g/cm$^3$.

11. The vehicle member of claim 10 further comprising a fourth polymeric foam layer having a thickness from 0.05 to 3.0 mm, the third polymeric foam layer disposed between the second and forth polymeric foam layers, the fourth polymeric foam layer having a density less than the density of the third polymeric foam layer and greater than 0.05 g/cm$^3$.

12. The vehicle member of claim 1, wherein the second polymeric foam layer comprises:
    a (meth) acrylate matrix; and
    gas bubbles, hollow particles, or a combination thereof, dispersed in the matrix.

13. The vehicle member of claim 12, wherein the second polymeric foam layer comprises the hollow particles dispersed in the matrix, the hollow particles comprising hollow microspheres.

14. The vehicle member of claim 1, wherein a strength of radio waves reflected by the radio-wave anti-reflection sheet and the multilayer body portion is P1 when irradiated with radio waves having a first strength and a first frequency in a range of 60 to 90 GHz in a direction perpendicular to the first major surface from the first major surface side, and wherein a strength of radio waves reflected by a flat metal surface is P0 when the metal surface is irradiated with radio waves having the first strength and the first frequency in a direction perpendicular to the metal surface, P1-P0 being less than-15 dB.

15. The vehicle member of claim 14, wherein a strength of radio waves reflected by the multilayer body portion is P2 when the radio-wave anti-reflection sheet is removed from the multilayer body portion and the multilayer body portion is irradiated with radio waves having the first strength and the first frequency in a direction perpendicular to the outermost major surface from the radio-wave anti-reflection sheet side, P1-P2 being less than-3 dB.

16. The vehicle member of claim 1, wherein the radio-wave anti-reflection sheet reduces a reflection of radio waves having a first frequency in a range of 60 to 90 GHz and substantially normally incident on the multilayer body portion by at least 5 dB.

17. The vehicle member of claim 1, wherein the radio-wave anti-reflection sheet reduces a reflection of radio waves having a frequency in a range of 60 to 90 GHz and substantially normally incident on the multilayer body portion by at least 10 dB.

18. The vehicle member of claim 1, wherein the multilayer body portion forms a chamber, the radio-wave anti-reflection sheet disposed in the chamber.

* * * * *